United States Patent [19]

Takikawa et al.

[11] Patent Number: 4,917,221

[45] Date of Patent: Apr. 17, 1990

[54] SLIDE TYPE EXHAUST BRAKE SYSTEM

[75] Inventors: Kazunori Takikawa, Numazu; Ryoichi Suzuki, Mishima, both of Japan

[73] Assignee: Usui Kokusai Sangyo Kaisha Ltd., Shizuoka, Japan

[21] Appl. No.: 314,825

[22] Filed: Feb. 23, 1989

[30] Foreign Application Priority Data

Mar. 11, 1988 [JP] Japan .............................. 63-32373[U]

[51] Int. Cl.[4] .............................. F02D 9/06; F16K 3/02

[52] U.S. Cl. ...................................... 88/273; 123/323; 137/630.12; 251/117.

[58] Field of Search ................ 188/154, 273; 123/323; 251/117; 137/630.12, 630.14, 630.15

[56] References Cited

U.S. PATENT DOCUMENTS

| | | |
|---|---|---|
| 742,308 | 10/1903 | Gerrard . |
| 795,057 | 7/1905 | O'Brien . |
| 1,436,412 | 11/1922 | Skiffington . |
| 1,620,100 | 3/1927 | Hoxton . |
| 2,845,306 | 7/1958 | Carver . |
| 3,342,203 | 9/1967 | Abercrombie . |
| 3,720,227 | 3/1973 | Curran . |
| 4,054,156 | 10/1977 | Benson . |
| 4,062,332 | 12/1977 | Perr . |
| 4,093,046 | 6/1978 | Perr . |
| 4,205,704 | 6/1980 | Benson . |
| 4,408,627 | 10/1983 | Harris . |
| 4,452,269 | 6/1984 | Kindermann . |
| 4,553,648 | 11/1985 | Suzuki et al. . |
| 4,615,354 | 10/1986 | Bianchi . |
| 4,643,226 | 2/1987 | Bälz . |
| 4,671,489 | 6/1987 | Jankovic . |
| 4,685,544 | 8/1987 | Takigawa et al. . |
| 4,733,687 | 3/1988 | Takigawa et al. . |
| 4,751,987 | 6/1988 | Takigawa et al. . |
| 4,773,440 | 9/1988 | Yanagawa et al. . |

FOREIGN PATENT DOCUMENTS

| | | |
|---|---|---|
| 3009453 | 9/1981 | Fed. Rep. of Germany . |
| 2223602 | 10/1974 | France . |
| 55-117047 | 9/1980 | Japan . |
| 55-119926 | 9/1980 | Japan . |
| 55-123328 | 9/1980 | Japan . |
| 55-123330 | 9/1980 | Japan . |
| 60-3437 | 9/1985 | Japan . |
| 44095 | 3/1916 | Sweden . |
| 4311 | of 1818 | United Kingdom . |
| 14098 | of 1891 | United Kingdom . |
| 1378497 | 12/1974 | United Kingdom . |

*Primary Examiner*—George E. A. Halvosa
*Attorney, Agent, or Firm*—Anthony J. Casella; Gerald E. Hespos

[57] ABSTRACT

There is disclosed a slide type exhaust brake system including a housing accommodating a valve member formed with an exhaust pressure adjusting hole, and a piston rod to which an auxiliary valve member composed of a support frame member assuming a substantially C-shape in section and a liner member is locked. The liner member has its upwardly bent walls at both ends in the longitudinal direction and assumes a cross-like shape adaptive to be sustained by a pair of sustaining walls protruded from both sides of the valve member and fitted in inclined induction slots formed in the support frame member. The liner member closes the exhaust pressure adjusting hole when closing an exhaust passageway by the valve member which is simultaneously thrust in one direction. When opening the exhaust passageway, the liner member opens the adjusting hole, while the valve member is moved in the other direction. The liner member is also formed with at least one exhaust gas escape hole for preventing an excessive load to exhibit the Venturi effect when closing the adjusting hole.

2 Claims, 3 Drawing Sheets

SLIDE TYPE EXHAUST BRAKE SYSTEM

BACKGROUND OF THE INVENTION

1. Field of the Invention

The present invention relates to an improvement of a valve mechanism in a slide type exhaust brake system, connectively interposed in an exhaust pipe generally in a large-sized vehicle such as a truck, a bus or the like, for imparting braking effects to the vehicle by creating a load on the machinery while blockading an exhaust passageway of an exhaust gas flowing through the exhaust pipe when travelling on sharp slopes 2. Description of the Prior Art A valve mechanism in this type of conventional exhaust braking system is, as illustrated in FIG. 6 (see U.S. Pat. No. 4,819,696), arranged such that: a tabular valve member (20) incorporated in a reciprocatory passageway of a housing of a brake body is secured to the top of a piston rod and has its surface formed crosswise with a slot-like exhaust pressure adjusting hole (21); a frame member accommodating a liner member (23) sliding on the surface of valve member (20) which may be conceived as an auxiliary valve member (22) is fitted to a portion in close proximity to the top of piston rod through a block member engaging with valve member (20); the surface of the valve member is formed with an exhaust gas escape hole (24) intended to prevent an excessive load on the machinery when closing the exhaust passageway; when opening and closing the exhaust passageway, the top of the piston rod and the side surface of the block member engage with or impact on valve member (20); and subsequently, liner (23) on the side of auxiliary valve member (22) functions to open and close exhaust pressure adjusting hole (21), thus thrusting the valve member in one direction and pulling up it in the other direction.

Exhaust gas escape hole (24), passing through the surface of valve member (20), for preventing the excessive load has a least hole area within such a range that the machinery does not cease to behave in association with a magnitude of machine output and a braking function. In the foregoing conventional valve mechanism, however, exhaust gas escape hole (24) is formed simply in the surface of valve member (20), and hence, for instance, the exhaust pipe stands erect. Besides, valve member (20) of the exhaust brake system slides in a horizontal direction, and liner member (23) is mounted downwards. In such a state, liner member (23) acts to close the exhaust passageway by its own weight, at which time the exhaust gas is partly discharged from exhaust gas escape hole (24) of valve member (20). In addition, there is created a gap between sliding surfaces of liner member (23) and closed exhaust pressure adjusting hole (21). There is possibility where the exhaust gas escapes from this gap, resulting in an incipient delay in braking and also a loss of braking effects.

SUMMARY OF THE INVENTION

It is a primary object of the present invention to provide a slide type exhaust brake system capable of preventing escape of an exhaust gas from between the sliding surfaces by producing a tight-fitted condition of a liner member on the side of an auxiliary valve member by dint of an exhaust pressure when closing the exhaust passageway irrespective of a state where the system is installed, and exhibiting both good respondency in braking and sufficient braking effects with no loss.

To this end, according to one aspect of the invention, there is provided a slide type exhaust brake system comprising: an exhaust brake body; a tabular valve member having its surface formed with an exhaust pressure adjusting hole; a housing including a reciprocatory passageway accommodating the valve member which communicates in a substantially orthogonal direction with an exhaust passageway having its both sides from which a connecting wall leading to an exhaust pipe is protruded; an air cylinder unit connectively provided at an upper end of the reciprocatory passageway; a piston rod penetrating a partition wall apart from the air cylinder unit and having its top portion to which the valve member is secured; a liner member defined as an auxiliary valve member which engages with the valve member; and a support frame member, mounted on a portion vicinal to the top of the piston rod through a block member, in which the liner member is held. With this arrangement, when the valve member functions to close the exhaust passageway, the auxiliary valve member also closes the exhaust pressure adjusting hole, and simultaneously the valve member is thrust in one direction with the movement of the piston rod. Whereas in opening the exhaust passageway, the auxiliary valve member opens the exhaust pressure adjusting hole, and at the same moment the auxiliary valve member engages with the valve member through the block member, thus moving the valve member in the other direction. In the thus constructed exhaust brake system, the liner member is formed with at least one exhaust gas escape hole, so superposed on the exhaust pressure adjusting hole as to pass therethrough, for preventing an excessive load in a state where the exhaust pressure adjusting hole is closed when the valve member closes the exhaust passageway.

In accordance with the slide type exhaust brake system of the invention, when closing the exhaust passageway by use of the valve member, the liner member on the side of the auxiliary valve member acts to close the exhaust pressure adjusting hole. In this state, the exhaust gas escape hole formed in the liner member is so superposed on the exhaust pressure adjusting hole as to pass therethrough. Based on this structure, a flow of exhaust gas running through the exhaust gas escape hole exhibits the Venturi effect under a tight-fitted condition on the sliding surface in association with an exhaust pressure exerted on the surface of the liner member in the braking process. The pressure drops down because of an increase in velocity at which the exhaust gas flows through the escape hole due to the Venturi effect. This pressure drop in turn causes an increment in difference between the relative pressures, with the result that the tight-fitness with respect to the sliding surface of the liner member can be obtained more surely. Hence, the liner member is effective in quickly preventing the escape of exhaust gas with certainty between the sliding surfaces in any posture that the exhaust brake system takes when being installed.

BRIEF DESCRIPTION OF THE DRAWINGS

Other object and advantages of the invention will become apparent during the following discussion in conjunction with the accompanying drawings, in which.

Figure 1:
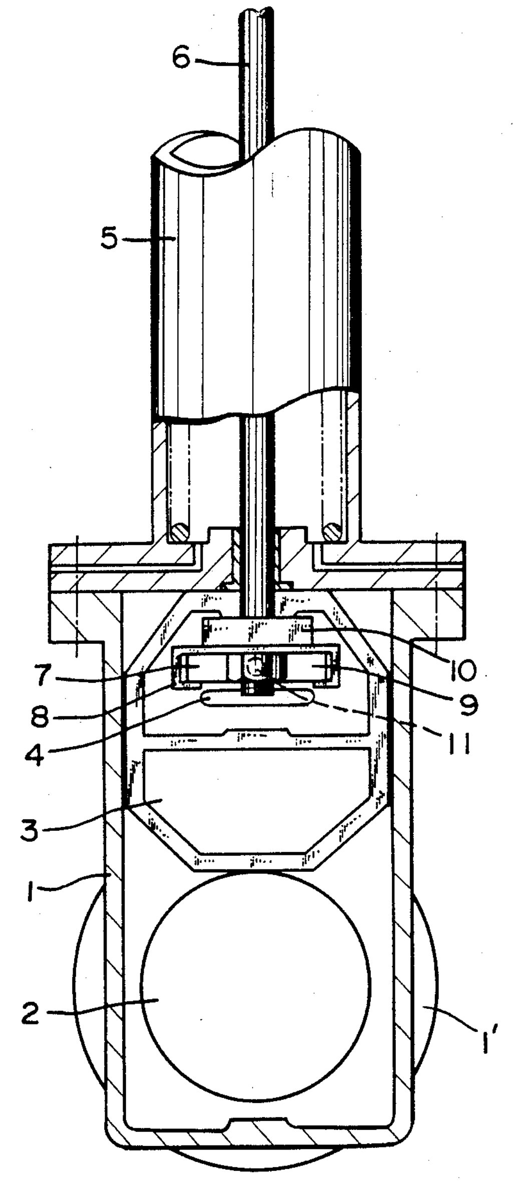
FIG. 1 is a partially cut-away plan view of a slide type exhaust brake system when opening an exhaust passageway, illustrating one embdoiment of the present invention.
Figure 2:
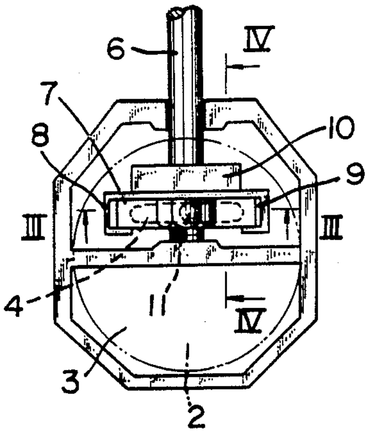
FIG. 2 is a plan view depicting a single valve mechanism unit relative to the principal unit of FIG. 1 according to the present invention when closing the exhaust passageway.
Figure 3:
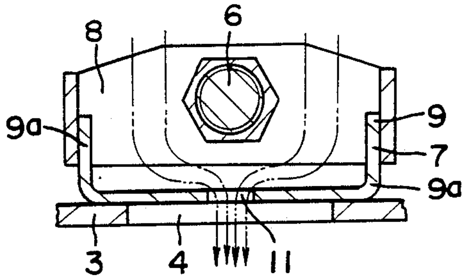
FIG. 3 is an enlarged sectional view taken substantially along the line IV—IV of FIG. 2.
Figure 4:
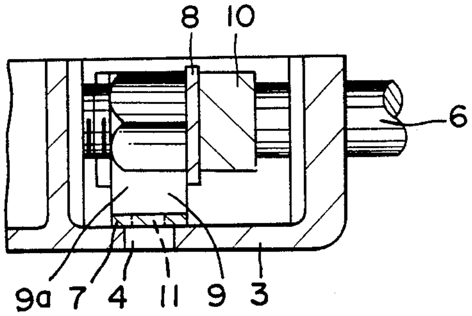
Figure 5:
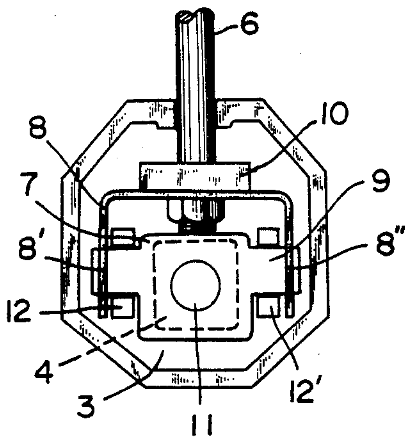
FIG. 5 is a view, corresponding to FIG. 2, of another embodiment of the present invention.
Figure 6:
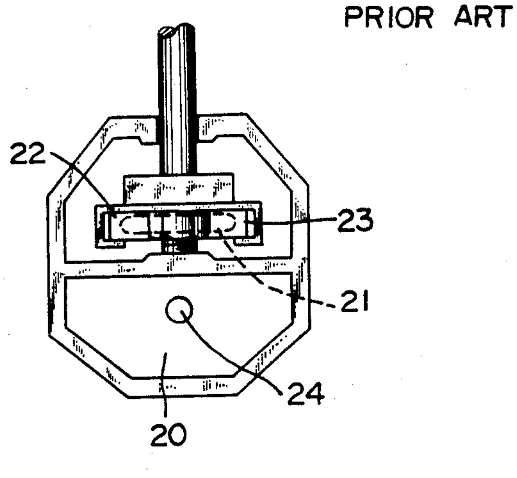
Fig. 6 PRIOR ART
FIG. 6 is a plan view depicting a single valve mechanism unit of the prior art when closing the exhaust passageway.

DETAILED DESCRIPTION OF THE PREFERRED EMBODIMENTS:

Referring first to FIGS. 1 through 5, the numeral (1) designates a housing of an exhaust brake body. Housing (1) includes a reciprocatory passageway of a tabular valve member (3) which communicates in a substantially orthogonal direction with an exhaust passageway (2) having at each opposed end a connecting wall (1') to which an exhaust pipe (not shown) is connected. The reciprocatory passageway of the housing accommodates valve member (3) the bottom wall surface of which is formed with an exhaust pressure adjusting hole (4). Valve member (3) is also secured to the top of a piston rod (6) penetrating a partition wall apart from an air cylinder unit (5) connectively provided at the upper end of the reciprocatory passageway. An auxiliary valve member generally indicated at (7) is composed of a liner member (9) sliding on the surface of valve member (3). Liner member (9) is housed in a frame member (8) conceived as a support frame unit mounted on a portion vicinal to the top of piston rod (6) through a fixed block member (10) engaging with valve member (3). Liner member (9) also includes bent walls (*9a, 9a*) bent upwards at its both ends in the longitudinal direction. The free ends of the bent walls (*9a, 9a*) may be further extended horizontally. The numeral (11) represents an exhaust gas escape hole for preventing an excessive load on the machinery in a braking process. Exhaust gas escape hole (11) is so superposed on exhaust pressure adjusting hole (4) as to pass therethrough in a state where the adjusting hole is closed when closing exhaust passageway (2) by use of valve member (3). Turning next to FIG. 5, there is illustrated another embodiment of the present invention, the arrangement being such that the auxiliary valve member is sustained by a pair of sustaining walls (12, 12') provided at the front and rear portions on the surface of valve member (3), each bilaterally projecting in the crosswise direction with the center of axial core being sandwiched therebetween in the vicinity of exhaust pressure adjusting hole (4) in a state where both ends of liner member (9) assuming a cross-like configuration are fitted in inclined induction slots (8', 8'') formed in the movable direction in right and left walls of support frame member (8) assuming a substantially C-shape in section.

Note that one circle exhaust gas escape hole (11) is formed in the center of axial core in the longitudinal direction in the illustrative embodiment, but the configuration is not limited to this. Alternatively, an oval exhaust gas escape hole which is expanded in the longitudinal direction of the liner member (9) may be formed deviating from the center of axial core, or a plurality of exhaust gas escape holes may be formed in liner member (9).

As discussed above, the slide type exhaust brake system according to the present invention has a structure wherein especially the exhaust gas escape hole for preventing the excessive load is formed preferably in a substantially central portion of liner member (9) accommodated in the frame member conceived as auxiliary valve member (7) or in support member (8), or sustained by bilateral side walls thereof, the exhaust gas escape hole being so superposed on exhaust pressure adjusting hole (4) as to pass therethrough when closing the exhaust passageway. Based on this structure, the remarkably useful brake system is capable of: providing the tight-fitted condition more surely between the sliding surfaces owing to the exhaust pressure acting on the surface of liner member (9) and to the Venturi effect in escape hole (11) in association with a flow of exhaust gas which is indicated by an arrow of FIG. 3 regardless of the posture that the exhaust brake system takes when being installed when closing exhaust passageway (2) by use of valve member (3); having good respondency by eliminating the incipient delay in braking; and exhibiting sufficient braking effects with no loss.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:

1. A slide type exhaust brake system comprising:

a housing having an exhaust passageway extending therethrough and a reciprocatory passageway communicating with the exhaust passageway and angularly aligned thereto;

a tabular valve member having a bottom wall with an exhaust pressure adjusting hole extending therethrough, said tabular valve member being mounted in the reciprocatory passageway for reciprocal movement into and out of the exhaust passageway;

a piston and cylinder unit mounted in proximity to the housing and comprising a piston rod reciprocally movable in the reciprocatory passageway toward and away from the exhaust passageway, said piston rod comprising an end engageable with the tabular valve member for urging the tabular valve member into the exhaust passageway upon movement of the piston rod toward the exhaust passageway;

a block securely mounted to the piston rod in selected spaced relationship to the end thereof, said block being engageable with the tabular valve member for urging the tabular valve member out of the exhaust passageway upon movement of the piston rod away from the exhaust passageway; and an auxiliary valve member mounted to the piston rod intermediate the block and the end of the piston rod, said auxiliary valve member comprising a support frame of generally C-shaped configuration with a base mounted to the piston rod adjacent the block and a pair of generally parallel arms extending from the base, each said arm including a slot formed therein, said auxiliary valve member further including a liner having a pair of opposed ends and an intermediate portion, the ends being slidably engaged by the slots of the support frame and the intermediate portion being slidable along the bottom wall of the tabular valve member for alternately at least partly covering and at least partly uncovering the exhaust pressure adjusting hole in the tabular valve member, said liner being provided with at least one exhaust gas escape hole extending therethrough at the intermediate portion thereof and disposed to be aligned with the exhaust pressure adjusting hole of the tabular valve member when the tabular valve member is disposed in the exhaust passageway, such that the exhaust gas escape hole prevents excessive loads on said exhaust brake system when said tabular valve member is disposed in the exhaust passageway.

2. The system as set forth in claim 1, wherein the opposed ends of said liner member has walls at both said ends thereof bent away from the bottom wall of the tabular valve member for slidably engaging the slots of the support frame.

* * * * *